(No Model.)
M. D. CROWELL.
LOCK WHEEL FOR VALVE STEMS.
No. 441,357. Patented Nov. 25, 1890.
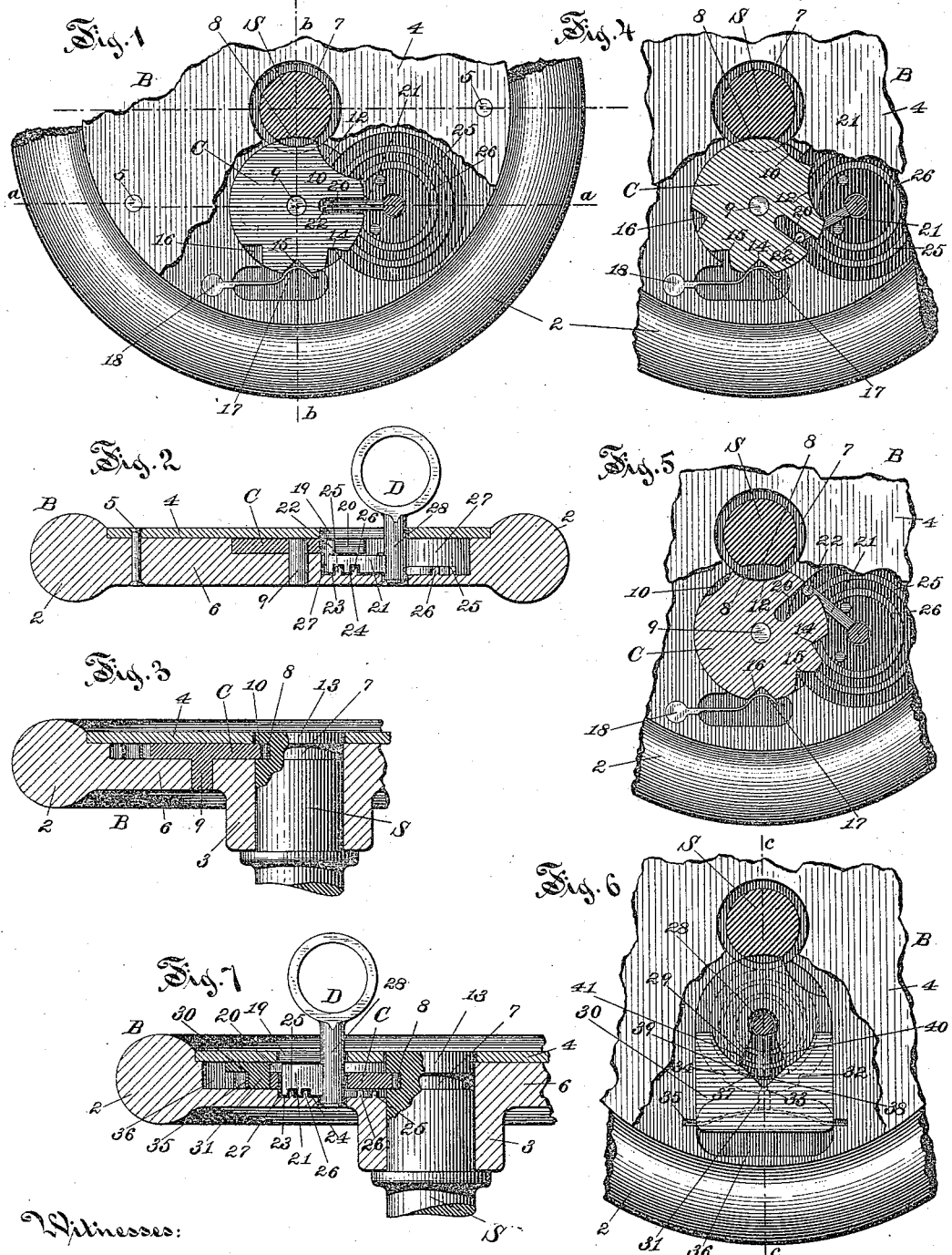
Witnesses:
W. M. Bjorkman
Henry L. Rickard
Inventor:
Myron D. Crowell
By his Attorney
F. A. Richards
THE NORRIS PETERS CO., PHOTO-LITHO., WASHINGTON, D. C.

United States Patent Office.

MYRON D. CROWELL, OF HARTFORD, CONNECTICUT, ASSIGNOR OF ONE-HALF TO WILLIAM A. LAMB, OF SAME PLACE.

LOCK-WHEEL FOR VALVE-STEMS.

SPECIFICATION forming part of Letters Patent No. 441,357, dated November 25, 1890.

Application filed July 5, 1890. Serial No. 357,764. (No model.)

*To all whom it may concern:*

Be it known that I, MYRON D. CROWELL, a citizen of the United States, residing at Hartford, in the county of Hartford and State of Connecticut, have invented certain new and useful Improvements in Lock-Wheels for Valve-Stems, &c., of which the following is a specification.

This invention relates to lock-wheels for valve-stems and other shafts usually hand-operated by means of a crank or wheel thereon, the object being to provide for leaving said stem or shaft securely set in any position by unlocking said actuating crank or wheel therefrom.

The invention is in part in the nature of an improvement on the lock-wheel described and claimed in the application of Lamb and Crowell, Serial No. 342,654, filed March 4, 1890, to which reference may be had.

In the drawings accompanying and forming a part of this specification, Figure 1 is a plan view, partially in section and partially broken away, of a hand-wheel furnished with my present improvements. Fig. 2 is a sectional view of the same in line $a\,a$, Fig. 1. Fig. 3 is a section in the line $b\,b$, Fig. 1. Figs. 4 and 5 are plan views similar to Fig. 1, and illustrate the operation of the improvements by showing certain operative parts in successive positions. Fig. 6 is a plan view similar to Fig. 1, of a modification of certain features of the improvements. Fig. 7 is a section in line $c\,c$, Fig. 6.

Similar characters designate like parts in all the figures.

The hand-wheel B, as herein shown, is of an ordinary form used on valves, having the rim 2 and the hub 3 bored to fit on the valve-stem or other shaft S, and is furnished with a cap or cover, as 4. (Shown fixed on the disk 6 of the wheel by means of rivets 5.) Near the upper end of the stem S there is a groove 7 formed therein, and in one side of said groove there is a concave lock-tumbler-seat 8. The lock bolt or tumbler C is a revolving part contained in a recess formed in the wheel contiguous to the valve-stem S and under the cover or plate 4. Said tumbler C may have a central pivot, as 9, which may be fixed in the disk 6 and fit in a central hole in the tumbler, as in Figs. 1 and 2; or said pivot may be formed on the tumbler and fit in a bearing-hole formed in the disk of the wheel, as in Fig. 3. In the periphery of the tumbler are formed one or more concave depressions, which, when the same are brought adjacent to the valve-stem, permit said stem to revolve in the wheel. According to my present improvements one of said concave spaces or depressions is lower than the other, for a purpose presently to be explained. The full diameter of the tumbler C, as shown in Fig. 4, fits into the concave side 8 of the valve-stem, thus locking said stem securely from turning, after the manner of a shaft-key. In its normal or inoperative position the tumbler C stands, as in Fig. 1, with the smaller peripheral recess 10 adjacent to the shaft S, thus permitting the wheel to be freely revolved on said shaft. If, now, the tumbler C be turned over toward the right, as in Fig. 4, said concave space 10 is carried toward the right hand, as there shown, while a portion of the periphery of full diameter is brought into the shaft-recess 8 to lock the shaft to the wheel, as above stated. If said tumbler C be turned in the opposite direction, as in Fig. 5, thus bringing the larger concave space 12 contiguous to said stem, said wheel may then not only be turned freely, but it may be raised therefrom by reason of said concave space being cut away sufficiently to clear the head 13 of the valve-stem. When the tumbler stands in the position shown in Fig. 1, a portion thereof bordering the peripheral space 10 stands in the groove 7 of the stem S, as indicated in the sectional view, Fig. 3, and serves, as will be clearly understood from the drawings, to prevent the wheel from being taken off from said stem.

For detaining the tumbler C in either one of said three positions I form in some part of the periphery thereof suitable detent-notches—as, for instance, 14, 15, and 16—for a detent-spring 17, fixed by its shank 18 in the body of the hand-wheel. The curved end of the said spring bears with suitable force against the tumbler, and by engaging in said detent-notches holds said tumbler in place with sufficient security.

For turning the tumbler I use a key, as D, which I insert through the key-hole 19 in the plate 4, as will be seen in Fig. 2. Said key (the tumbler being in the position shown in Figs. 1 and 2) passes down through the keyhole and through the slot 20 in the tumbler until the arm 21 of the key stands below the plane of the tumbler, while the pin or crank 22 of said arm stands in said slot 20. If, now, the key be turned toward the left, the tumbler will be turned to the position shown in Fig. 4, and if the key be turned toward the right the tumbler will be turned to the position shown in Fig. 5. In either of these positions, however, the arm 21 of the key lies under the tumbler, and the crank-pin 22 lies underneath the cover 4, so that in either of said positions the key cannot be taken from the wheel, but must be turned back to its position in Fig. 1 before removal; but this returning of the key unlocks the stem from the wheel, thus leaving the wheel inoperative. By this means the operator is obliged to leave the wheel inoperatively connected to the stem before he can remove the key from the wheel. In the bar 21 of the key, notches, as 23 and 24, may be formed for fitting on the guards or wards 25 and 26, formed in the key-space 27, said wards being for the purpose of preventing the use of improper keys in the wheel, after a well-known system used by lock-makers. Other kinds and arrangements of "ward" or tumbler keys may, however, be employed as may be desired, provided only that the said keys are constructed to actuate the tumbler in substantially the manner herein set forth.

In the modification shown in Figs. 6 and 7 the key-space is also in part the tumbler-space of the wheel, and the key is inserted with its stem 28 coinciding with the axis of said tumbler C, so that the tumbler may be freely turned with the key therein. In this case the tumbler, except for having the key-receiving space 29, is substantially the same as the tumbler C, Figs. 1 to 5, inclusive. For locking the tumbler in place I use in this modification a slide or sliding bolt 30, having a projection 31, constructed to engage with the several notches 32, 33, and 34. A suitable spring, as 35, lying in a space 36, formed therefor outside of said projection 31 and under said bolt, acts on the projection to throw the bolt forward, and thus lock the tumbler in either one or the other position. On turning the key during the early part of its movement the outer edge 37 bears against the incline 38 or 39, accordingly as the key is turned in one or the other direction, and thus forces back the lock-bolt 30 to unlock the tumbler. Next the side of the key-wing 21 bears against the side 40 or 41 of the key-space 29 in the tumbler, and thus turns the tumbler either one way or the other, as required. In this modification, also, the key, as soon as it is turned in either direction, passes under the cover 4, so that it may not be removed until first the tumbler 6 is reset in its inoperatively-connected position.

By the term "hand-wheel," as used herein, I mean not only a hand-wheel in the strict sense of the word, but also any wheel or shaft-actuating arm or crank fitted to the shaft S and furnished with the shaft-locking improvements herein set forth.

Having thus described my invention, I claim—

1. In a lock-wheel for shafts, the combination, with the stem having a lock-seat formed therein, of a revolving tumbler whose periphery fits in said seat for locking the wheel to the stem, said tumbler having a peripheral depression which when brought contiguous to the shaft permits the shaft to be turned.

2. In a lock-wheel for shafts, the combination, with the stem having a groove around the same, and having a lock-seat formed therein between the sides of the groove, of a revolving tumbler whose periphery fits in said seat for locking the wheel to the stem, said tumbler having two peripheral depressions, one of which when brought contiguous to the shaft permits the same to be turned while holding the wheel inoperatively connected to the shaft and the other of which when brought contiguous to the shaft permits removal of the wheel therefrom.

3. In a lock-wheel for shafts, the combination, with the stem having a lock-seat, substantially as described, formed therein, of the revolving tumbler carried in the wheel and slotted for the reception of a key for actuating the tumbler and a detent for detaining the tumbler.

4. In a lock-wheel for shafts, the combination, with the stem having a lock-seat, substantially as described, formed therein, of the revolving tumbler for locking the wheel to the stem, said tumbler being slotted for receiving the key, and a key constructed to engage the wheel and having its axis outside the periphery of the tumbler.

5. In a lock-wheel for shafts, the combination, with the stem having a lock-seat, substantially as described, formed therein, of the revolving tumbler for locking the wheel to the stem, a key-space, substantially as described, at one side of the tumbler, a key insertible in said space and constructed to engage the tumbler, and wards located in the key-space in engagement with corresponding notches in the key.

MYRON D. CROWELL.

Witnesses:
FRANCIS H. RICHARDS,
HENRY L. RECKARD.